(12) United States Patent
Statchuk

(10) Patent No.: US 7,792,826 B2
(45) Date of Patent: Sep. 7, 2010

(54) METHOD AND SYSTEM FOR PROVIDING RANKED SEARCH RESULTS

(75) Inventor: Craig Statchuk, North Gower (CA)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 11/754,721

(22) Filed: May 29, 2007

(65) Prior Publication Data

US 2008/0301111 A1 Dec. 4, 2008

(51) Int. Cl.
G06F 7/00 (2006.01)
G06F 17/30 (2006.01)

(52) U.S. Cl. ........................................ 707/723; 707/748

(58) Field of Classification Search .................. 707/5, 707/7, 706, 723, 728; 706/50
See application file for complete search history.

(56) References Cited

U.S. PATENT DOCUMENTS

| | | | | |
|---|---|---|---|---|
| 5,940,821 A * | 8/1999 | Wical | | 707/3 |
| 5,963,940 A * | 10/1999 | Liddy et al. | | 707/5 |
| 6,026,388 A * | 2/2000 | Liddy et al. | | 707/1 |
| 6,038,560 A * | 3/2000 | Wical | | 707/5 |
| 6,161,084 A | 12/2000 | Messerly et al. | | |
| 6,363,378 B1 * | 3/2002 | Conklin et al. | | 707/5 |
| 6,405,190 B1 * | 6/2002 | Conklin | | 707/3 |
| 6,460,034 B1 * | 10/2002 | Wical | | 707/5 |
| 6,526,440 B1 | 2/2003 | Bharat | | |
| 6,842,761 B2 * | 1/2005 | Diamond et al. | | 707/104.1 |
| 6,924,828 B1 * | 8/2005 | Hirsch | | 715/800 |
| 6,954,750 B2 * | 10/2005 | Bradford | | 707/5 |
| 6,963,867 B2 * | 11/2005 | Ford et al. | | 707/3 |
| 7,231,405 B2 | 6/2007 | Xia | | |
| 7,251,637 B1 | 7/2007 | Caid et al. | | |
| 7,266,548 B2 | 9/2007 | Weare | | |
| 7,472,113 B1 * | 12/2008 | Watson et al. | | 707/3 |
| 7,571,157 B2 * | 8/2009 | Chowdhury et al. | | 707/3 |
| 7,689,615 B2 * | 3/2010 | Burges et al. | | 707/723 |
| 2001/0054034 A1 | 12/2001 | Arning et al. | | |
| 2003/0110158 A1 | 6/2003 | Seals | | |
| 2004/0148278 A1 | 7/2004 | Milo et al. | | |
| 2004/0230572 A1 | 11/2004 | Omoigui | | |
| 2005/0165718 A1 | 7/2005 | Fontura et al. | | |
| 2005/0192955 A1 * | 9/2005 | Farrell | | 707/5 |
| 2005/0246322 A1 * | 11/2005 | Ravikumar et al. | | 707/3 |
| 2006/0053151 A1 | 3/2006 | Gardner et al. | | |
| 2006/0155685 A1 | 7/2006 | Grim et al. | | |
| 2006/0212461 A1 | 9/2006 | Meysman | | |
| 2007/0055680 A1 | 3/2007 | Statchuk | | |
| 2007/0055691 A1 | 3/2007 | Statchuk | | |
| 2008/0027971 A1 | 1/2008 | Statchuk | | |
| 2008/0243830 A1 * | 10/2008 | Abhyanker | | 707/5 |

* cited by examiner

Primary Examiner—James Trujillo
Assistant Examiner—Pavan Mamillapalli
(74) Attorney, Agent, or Firm—Shumaker & Sieffert, P.A.

(57) ABSTRACT

Subject ranking management system provides a ranked search result for a given set of one or more search terms. The subject ranking management system determines, using a taxonomy, one or more parent subject items related to one or more matching subject items that match a given set of search terms. The system statistically ranks relevant subject items including the matching subject items and the parent subject items, and organizes the relevant subject items as ranked by the item ranking calculation unit. Ranked subjects can then be presented to an operator to assist with further refinement or used to automatically produce a better search without further operator invention.

24 Claims, 4 Drawing Sheets

Products
- Camping Equipment
  - Tents
    - *Tent Product 1*
    - *Tent Product 2*
    - ...
  - Sleeping Bags
    - *Sleeping Bag Product 1*
    - *Sleeping Bag Product 2*
    - ...
  - ...
- Outdoor Gear
  - Binoculars
    - *Binocular Product 1*
    - *Binocular Product 2*
    - ...
  - GPS Device
    - *GPS Product 1*
    - *GPS Product 2*
    - ...
- ...

Figure 5

Name (ID)
Products (31)
    Outdoor Equipment (72)
        Sleeping Bags (43)
            Mountain Bag (54)
        Sleeping Accessories (66)
            Bag Stuff-Sack (88)
            Pillow Bag (66)
    Golf Equipment (22)
        Carry Bag (98)
    Apparel (76)
        Suit Bag (65)
    Garbage Supplies (68)
        Bag Ties (86)
    Humor (96)
        Bag of Jokes (69)

Figure 6

METHOD AND SYSTEM FOR PROVIDING RANKED SEARCH RESULTS

FIELD OF INVENTION

The present invention relates to a method and system for ranked search results, and especially to a method and system that improves search queries using declarative taxonomies.

BACKGROUND OF THE INVENTION

There are various search engines available to conduct full text searches. However, full text searches often involves ambiguities in their search queries. Especially, traditional search technologies often provide incomplete or irrelevant results in the Corporate Performance Management (CPM) environments. In the CPM environments, CPM tools, such as Business Intelligence (BI) tools, are used to manage business oriented data and metadata.

Declarative taxonomies, which are well-defined, external subject hierarchies, are often used to disambiguate full text search queries. When searching a taxonomy for subjects related to a given set of search terms, full text search engines can match from zero to millions of subject items. The resulting "disambiguated" queries can contain literally millions of extra search terms. Searching for "popular" terms in the business environments, such as "sales", "product" or "revenue", often add too many additional subject related terms to be useful.

Search engines routinely use methods such as "page rank" references and other statistical and linguistic ranking criteria to create ordered search results. An example of such search engines is a page ranking engine that is described in U.S. Pat. No. 6,526,440 issued to Bharat. However, these search engines are not sufficient to search complex data like business oriented metadata since they rely on ranking algorithms that work with data found primarily in the Global Internet and not inside a business.

Some search engines use taxonomies to improve search results. Creation of taxonomies has been carried out by a manual process or by an automated process based on advanced linguistic analysis. However, business taxonomies are difficult and expensive to build manually. Also, linguistic analysis is often complicated and thus prone to result in inaccurate outcome.

In addition, these search engines employ the statistical or linguistic ranking algorithms or methods over search results. Accordingly, these methods do not avoid the problems that are involved in the search results as described above.

It is therefore desirable to provide a system that provides better search results.

SUMMARY OF THE INVENTION

It is an object of the invention to provide an improved method and system for providing search results using taxonomies.

The invention uses a subject ranking method that allows subject data to be ranked by relevance. In an embodiment, the resulting subjects are then used to augment an operator query to provide matches about related subjects or concepts.

In accordance with an aspect of the present invention, there is provided a subject ranking management system for providing ranked search results. The subject ranking management system comprises a subject hierarchy managing unit, a ranking calculation unit, and a result organizing unit. The subject hierarchy managing unit is provided for determining, using a taxonomy, one or more parent subject items for one or more matching subject items that match a given set of one or more search terms. The ranking calculation unit is provided for statistically ranking relevant subject items including the matching subject items and the parent subject items. The result organizing unit is provided for organizing the relevant subject items as ranked by the item ranking calculation unit.

In accordance with another aspect of the invention, there is provided a method of providing a ranked search result. The method comprises the steps of determining, using a taxonomy, one or more parent subject items of one or more matching subject items that match a given set of one or more search terms, statistically ranking relevant subject items including the matching subject items and the parent subject items, and organizing the relevant subject items based on the ranking.

In accordance with another aspect of the invention, there is provided a computer readable medium storing computer readable code having instructions or statements for use in the execution in a computer of a method of providing a ranked search result. The method comprises the steps of determining, using a taxonomy, one or more parent subject items of one or more matching subject items that match a given set of one or more search terms, statistically ranking relevant subject items including the matching subject items and the parent subject items, and organizing the relevant subject items based on the ranking.

In accordance with another aspect of the invention, there is provided a compute program product for use in a subject ranking management system for providing ranked search results, the computer program product having computer program code embodied in a machine readable medium. The computer program product comprises a module for determining, using a taxonomy, one or more parent subject items of one or more matching subject items that match a given set of one or more search terms, a module for statistically ranking relevant subject items including the matching subject items and the parent subject items, and a module for organizing the relevant subject items based on the ranking.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 5 is a diagram showing an example of a subject hierarchy;

FIG. 6 is a diagram showing an example of hierarchy scores; and

DETAILED DESCRIPTION OF PREFERRED EMBODIMENTS

Figure 1:
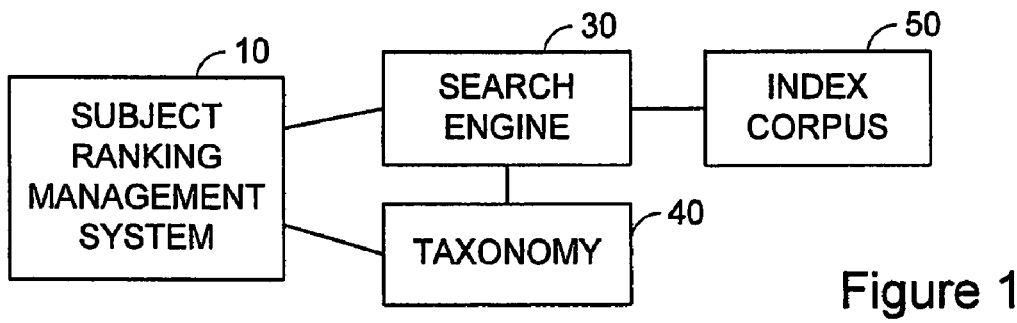
FIG. 1 is a block diagram showing a subject ranking management system in accordance with an embodiment of the present invention.

Referring to FIG. 1, a subject ranking management system 10 in accordance with an embodiment of the invention is described. The subject ranking management system 10 suitably works with a full-text search engine 30 that holds a taxonomy 40. The taxonomy 40 is a declarative taxonomy that represents well-defined, external hierarchies of topics or subjects. The search engine 30 is used to search a target index corpus 50 for search terms or target data that is related in a certain manner to the taxonomy 40. The index corpus 50 stores indexes of data or terms in documents to be searched. The search engine 30 searches the index corpus 50 for a given set of search terms contained in a query and generates a search result containing subject data or items that match the given set of search terms.

The subject ranking management system 10 takes the search result of the search engine 30 as an intermediate result, and applies ranking to the subject data in the intermediate result so that the subject data is ranked by relevance, rather than applying ranking to search results that would be generated if the search terms were given directly to the index corpus 50. This allows related subjects, or a subset of subjects related to the search terms, to be effectively used by the search engine 30 in a subsequent search of the index corpus 50. Using related subjects in a subsequent search of the index corpus 50 generally provides additional relevant search results that would not otherwise be included in search results generated from search terms alone.

In order to apply ranking to subject data, the subject ranking management system 10 employs a statistical subject ranking algorithm or method that relies primarily on mathematics, rather than language semantics, to build full text search queries, or operator queries Using the subject ranking method, the subject ranking management system 10 attempts to reorganize the intermediate results, e.g., move relevant high-level subject items to the top of an intermediate result list. The subject ranking management system 10 also attempts to retrieve related terms or subject items and add them to the intermediate result list. Such intermediate results are used, in turn, to build a more precise and yet wider ranging full-text search query. Thus, the subject ranking management system 10 can augment the query so that the augmented query is applied against the index corpus 50. These augmented full text search queries based on additional terms retrieved from the subject ranking method are often better than those based on language semantics. Thus, the full text search queries based on the subject ranking method often provide better search results against a related target index corpus 50.

The intermediate results returned to the subject ranking management system 10 from the search engine 30 are subject items from the index corpus 50 that represents the declared taxonomy 40. For example, consider a taxonomy with the following structure:
  Countries
  North America
  Canada
  USA There are index items in the index corpus 50 that describe the following subject items:
1) the subject name
2) one or more references to original business data
3) Reference to one or more parent subject items also stored in the index corpus 50
4) Reference to one or more child subject items also stored in the index corpus 50

The subject name is ultimately used in the subsequent query to the index corpus 50. The references to parent subject items and children subject items are primary factor in determining the ranking of each subject item that matched the search terms.

Figure 2:
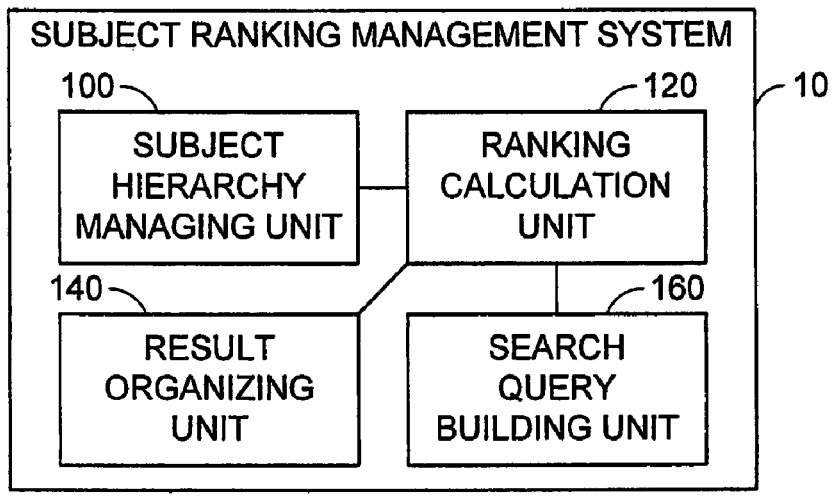
FIG. 2 is a block diagram showing an embodiment of the subject ranking management system.

FIG. 2 shows an embodiment of the subject ranking management system 10. The subject ranking management system 10 has a subject hierarchy managing unit 100, a ranking calculation unit 120 and a result organizing unit 140.

The subject hierarchy manager 100 manages a search result generated by the search engine 30 for a given set of search terms. The search result contains subject items that matched the given set of search terms. The subject hierarchy managing unit 100 also finds parent subject items for the matching subject items using the taxonomy 40 of the search engine 30. In short, the subject hierarchy manager 100 returns a ranked set of subject items that match a given set of search terms and the parent subject items of the matching subject items. The matching subject items and their parent items may be collectively called "relevant subject items" hereinafter.

Figure 2A:
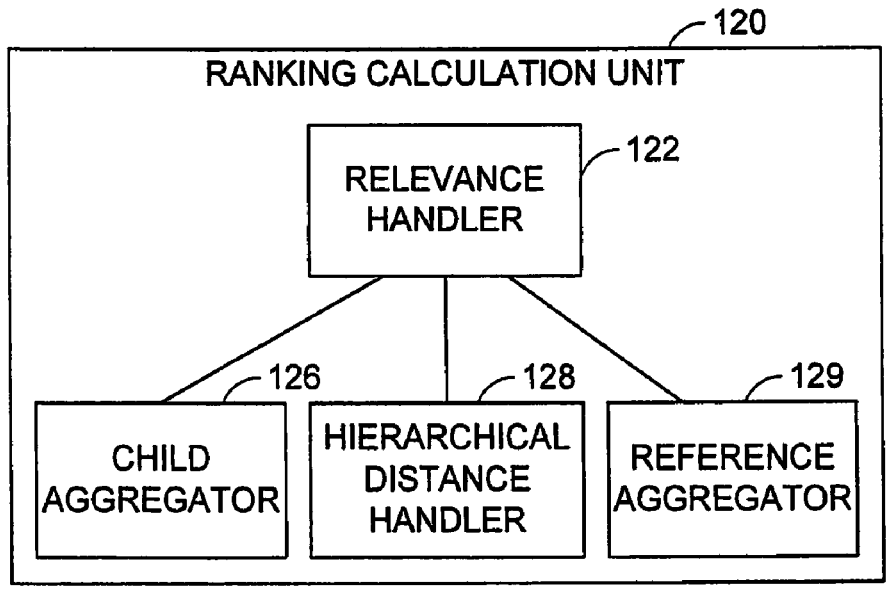
FIG. 2A is a block diagram showing an embodiment of the ranking calculation unit.

The ranking calculation unit 120 manages calculation of ranking of the relevant subject items. FIG. 2A shows an embodiment of the ranking calculation unit 120. The ranking calculation unit 120 has a relevance handler 122 to determine ranking order for the relevant subject items.

The relevance handler 122 orders requests for subject items that match a given set of search terms. It also receives from the subject hierarchy managing unit 100 the information of the parent subject items for the matching subject items.

The relevance handler 122 scores the relevant subject items based on hierarchy relationships to other subject items and the number of references to the relevant one of the matched subject items in the original indexed business data as represented by the taxonomy 40. The relevance handler 122 performs ranking score calculation so as to provide higher scores for more relevant subject items.

The relevance handler 122 uses a child aggregator 126, a hierarchical distance handler 128, and a reference aggregator 129. The child aggregator 126 aggregates the child subject items under a matching subject item in order to calculate a ranking score of the subject item. The relevance aggregator 129 counts references to a subject item in the original business content as represented in the taxonomy 40. The relevance aggregator 129 combines subject items with the same name into single result items. For example, all items with the name 'sales', each referencing different instances of business data, are combined into one item with name 'sales' that simultaneously references different business data instances. Items with more references are given preference. The hierarchical distance handler 128 determines a hierarchical distance from a matching subject item, i.e., the number of ancestors, to calculate a ranking score of each relevant subject item. Subject items that are closer to a matching subject item in hierarchical distance, are given preference to subject items that are further away from a matching subject item.

The result organizing unit 140 organizes the relevant subject items as ranked by the item ranking calculation unit 120. It typically rolls up subject items with the highest ranking scores to the top of a result list. The result organizing unit 140 may organize the results in a list form, in a form that is easy to view on a portable device, or in other form.

Thus, the subject ranking management system 10 removes the need to organize subject data exclusively in a tree form, which is a typical form of taxonomy presentation used in existing tools. The subject ranking management system 10 allows subjects to be displayed in lists or other types of user interface, such as, a type suitable for wireless devices.

The lists of subjects can also be used as "additional criteria" in further searches. To this end, the subject ranking management system 10 may also have a search query building unit 160, as shown in FIG. 2. The search query builder 160 builds a search query based on the ranked relevant subject items that are determined as being relevant by the ranking calculation unit 120. Such a search query improves result relevance and increases search speed when searching for terms that have a high number of occurrences in the subject index corpus 50.

The subject ranking management system 10 uses the declarative taxonomy 40. The taxonomy 40 may be held in the subject ranking management system 10. The subject ranking management system 10 may use a taxonomy built from business intelligence metadata, or other types of taxonomies, such as taxonomies available for biology, zoology, botany and paleontology.

Figure 3:
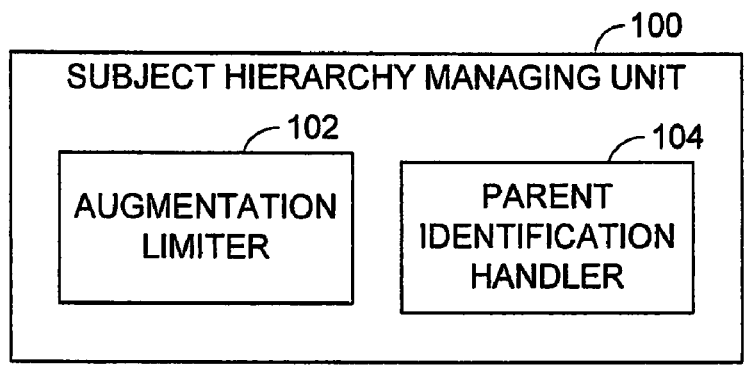
FIG. 3 is a block diagram showing an embodiment of a subject hierarchy managing unit of the subject ranking management system.

As shown in FIG. 3, the subject hierarchy managing unit 100 may have an augmentation limiter 102. The augmentation limiter 102 limits the number of parent levels searched to avoid undesirable reduction in a search speed. It also limits the number of ancestors that can affect relevance ranking as the hierarchical distance increases.

Also, the subject hierarchy managing unit 100 may have a parent identification handler 104 that provides to each subject in the index corpus 50 an identification of a parent subject item using the taxonomy 40. The subject hierarchy managing unit 100 can use the parent identifications to easily determine parent subject items of matching subject items. Also, the ranking calculation unit 120 can use the parent identifications to determine child subject items under a patent subject item.

Figure 4:
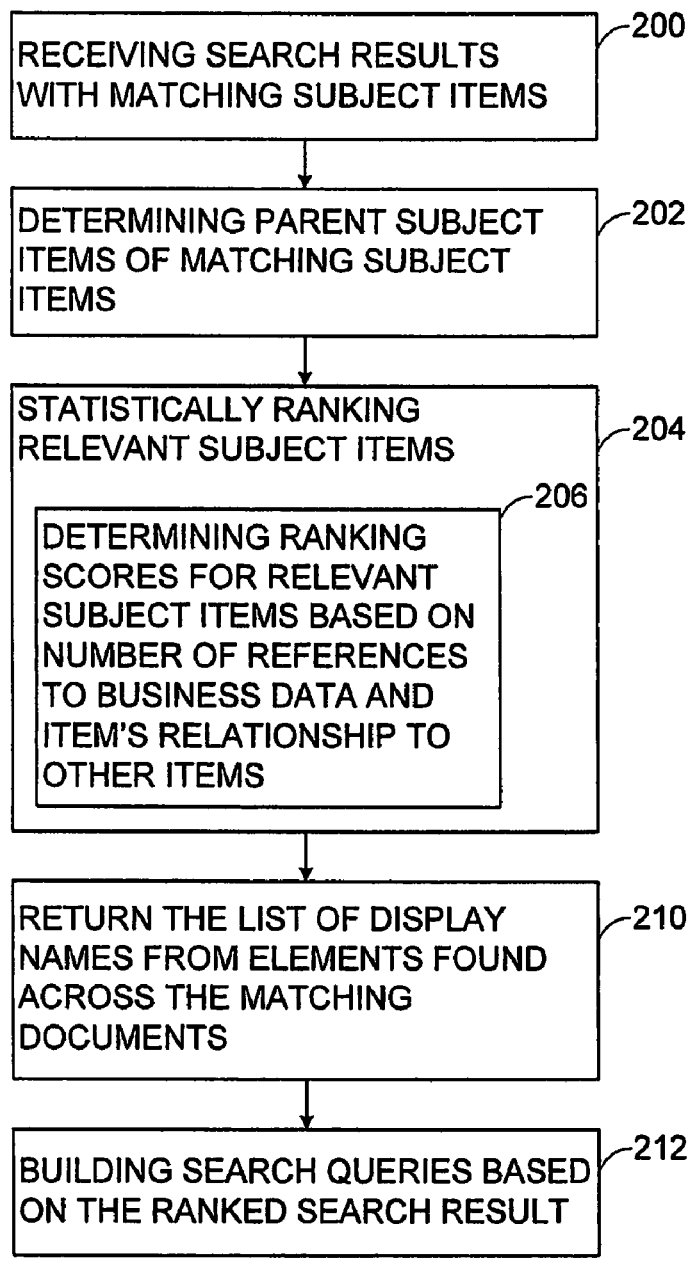
FIG. 4 is a diagram showing another embodiment of the subject ranking management system.

FIG. 4 shows the subject ranking method that ranks related subject items by relevance. The subject ranking method is a parameterized component. It is controlled by parameters that cause it to return different result sets for the same search terms.

The subject ranking management system 10 receives a search result containing subject items that match a given set of search terms (200). The system 10 determines parent subject items of the matching subject items, using the taxonomy 40 (202). Then, the system 10 statistically ranks the relevant subject items including the matching subject items and the parent subject items (204). The ranking is carried out by determining ranking scores for the relevant subject items based on the number of references to a matching subject item, and the item's relationship to other subject items other relevant subject items (206). The relevant subject items are organized based on the ranking (210). The subject ranking management system 10 may optionally build a new search query using the relevant subject items as additional criteria for a further search (212). This additional criteria can be applied without any operator action. Subsequent searches based on the ranked subject items can also be applied by allowing the operator to select from a list of ranked subject items.

The subject ranking by the subject ranking management system 10 is now further described using an example hierarchy of subject items shown in FIG. 5. The hierarchy of subject items may be held in a full text index of the subject ranking management system 10. This hierarchy defines a taxonomy of "is a" relationships obtained from business intelligence metadata.

Each subject items in the full text index may be represented as a document, e.g., a full-text index document, with field: type set to subject. Each document also contains, among other things, the following fields:

Field Contents
id Unique document ID for this item (a searchable GUID in text form)
name Display name for item
parentId Document ID of a parent in the hierarchy. Null means a top level-subject. Multiple parent relationships are represented with multiple child documents each pointing to different parents.

This structure makes it easy to find parents of a given subject document by simply retrieving the document specified in the parentId field. It is also relatively easy to find children of a given ID by simply executing a full-text search for documents with the parentId field equal to the given ID.

A full text search of the subject hierarchy returns a list of matching documents. As mentioned previously, each document contains a parentId field that points to the parent subject. In this example, subject items with term "bag" is searched. The search results in subject items matching with the search term "bag" as shown in Table 1.

TABLE 1

| Name | ID | ParentID |
|---|---|---|
| Sleeping Bags | 43 | 72 |
| Mountain Bag | 54 | 43 |
| Suit Bag | 65 | 76 |
| Carry Bag | 98 | 22 |
| Bag Stuff-Sack | 88 | 66 |
| Bag Ties | 86 | 68 |
| Pillow Bag | 55 | 66 |
| Bag of jokes | 69 | 96 |
| ... | Nn | Mm |

In order to find important topics related to the hierarchy implied in table 1, the subject rank management system 10 determines ranking scores for the matching subject items. Also, the system 10, using the parentId in Table 1, determines parent subject items, as shown in FIG. 6, and determines their hierarchy scores. As shown in FIG. 6, some subject items, e.g., Products and Outdoor Equipment, that were not matched in the initial search are very relevant to the search term.

The subject ranking system 10 attempts to move relevant high-level subjects to the top of result list. It determines ranking scores of the matching subject items and their parent subject items using the subject ranking method. In this example, the system 10 uses the following mathematical formula for subject scoring:

$$Rs = T + R*Rf + S_{1...n}(Dn/Df)$$

where: Rs=Ranking Score
T=Term score for subject from search engine
$S_{1...n}$=Sum of all children from 1 to n
Dn=Hierarchical distance for child n from this item
Df=Distance "boost" factor for each hierarchical distance step
R=Number references to data
Rf=Reference "boost" factor for referenced items.

When a subject has no children (i.e., it is a leaf node), its T value is used directly. Hierarchy scores are calculated by $S_{1...n}(Dn/Df)$. Reference scores are calculated by R*Rf.

The number of child elements processed can be controlled by parameter M where M is the maximum number of children to include in a calculation.

The validity of this algorithm is determined by experimentation using any full-text search engine. Different search engines typically return different values for T. The parameters available for experimentation are: Df, Rf and M. Raising Df increases relevance of child items. This relevance can be limited on the upper end by lowering M. Raising Rf increases the importance of references.

The subject ranking management system 10 can be efficiently implemented with any full-text search engine by adding the subject document structure with fields: Field, id, name, and parentId, as described above. This allows the search system to find parent and child relationships using the parentId field, as described above.

In one embodiment, the subject ranking management system 10 is used with the search engine 30 that implements its own taxonomy 40 using the index corpus 50. In a different embodiment, the subject ranking management system 10 may be incorporated with a content management system that indexes content of data sources and has taxonomy management functionality. An example of such a content management system is described in Canadian patent application No. 2,514,165 and U.S. patent application Ser. No. 11/494,974, the content of which is incorporated herewith by reference.

Figure 7:
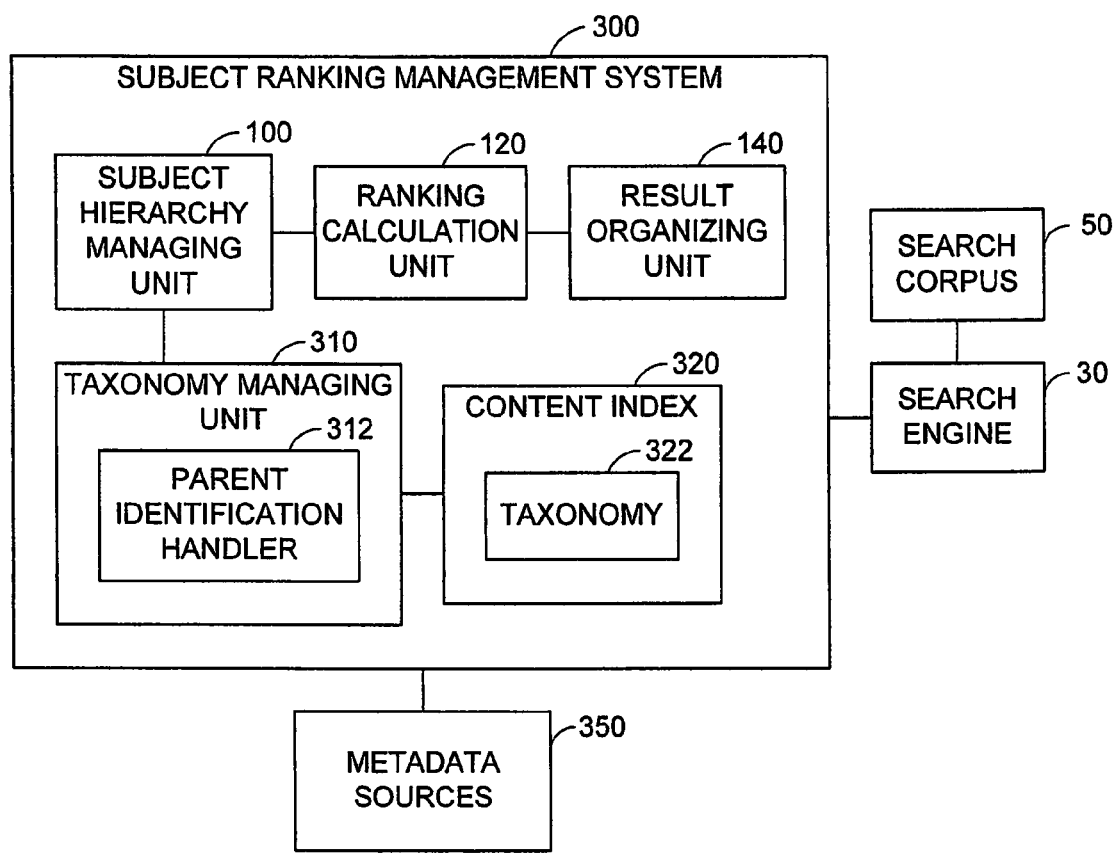
FIG. 7 is a flowchart showing a subject ranking method in accordance with an embodiment of the present invention.

FIG. 7 shows a subject ranking management system 300 in accordance with another embodiment of the invention. In this embodiment, the subject ranking management system 300 has a taxonomy managing unit 300. The taxonomy managing unit 310 indexes content, i.e., terms, in one or more metadata sources 350, and generates a searchable content index 320 storing the indexed terms. The content index 320 includes the taxonomy 322 of the indexed terms. The taxonomy managing unit 310 has a parent identification handler 312 that provides parent information for each subject item in the taxonomy 322.

The subject ranking management system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the subject ranking management system are described separately, however, two or more elements may be provided as a single element, or one or more elements may be shared with other components in one or more computer systems.

What is claimed is:

1. A subject ranking management system for providing ranked search results, the subject ranking management system comprising:
    a computer;
    a search engine unit to generate a set of search results, using an index corpus, wherein the search results comprise one or more matching subject items, and wherein the matching subject items match a given set of one or more search terms;
    a subject hierarchy managing unit to determine, using a taxonomy, one or more parent subject items for the one or more matching subject items, wherein the taxonomy includes at least one of topics and subjects, and wherein the index corpus is related to one of the at least one of the topics and the subjects of the taxonomy;
    a ranking calculation unit to statistically rank relevant subject items including the matching subject items and the parent subject items, wherein the ranking calculation unit comprises a relevance handler to determine a hierarchy score for each of the relevant subject items based on (1) hierarchy relationships between the each of the relevant subject items and other subject items, and (2) a number of references to one of the matching subject items in original data that is being searched; and
    a result organizing unit to organize the relevant subject items based on the statistical ranking performed by the ranking calculation unit for each relevant subject item,
    wherein at least one of the search engine unit, subject hierarchy managing unit, the ranking calculation unit, and the result organizing unit are executable by the computer.

2. The subject ranking management system as claimed in claim 1, wherein
    the ranking calculation unit has a child aggregation handler to aggregate child subject items under a matching subject item to calculate a ranking score of the matching subject item.

3. The subject ranking management system as claimed in claim 1, wherein
    the ranking calculation unit has a hierarchical distance handler to determine a hierarchical distance from a matching subject item to calculate a ranking score of a relevant subject item.

4. The subject ranking management system as claimed in claim 1, wherein
    ranking calculation unit has a reference aggregation handler to count references to the relevant subject items in the original data.

5. The subject ranking management system as claimed in claim 4, wherein the relevance aggregation handler combines relevant subject items with a same name into a single result item.

6. The subject ranking management system as claimed in claim 1, wherein the subject hierarchy managing unit has an augmentation limiter to limit augmentation of the parent or child subject items.

7. The subject ranking management system as claimed in claim 1, wherein the subject hierarchy managing unit has a parent identification handler to provide to each subject item in an index corpus an identification of a parent subject item using the taxonomy.

8. The subject ranking management system as claimed in claim 1, wherein the result organizing unit has a list generator to generate a list of relevant subjects based on the ranking calculated by the item ranking calculation unit.

9. The subject ranking management system as claimed in claim 1, wherein the subject hierarchy managing unit receives a search result from a full-text search engine having the taxonomy implemented.

10. The subject ranking management system as claimed in claim 9, wherein the subject hierarchy managing unit comprises a taxonomy handler to provide parent information for each subject item in the taxonomy.

11. The subject ranking management system as claimed in claim 1 further comprising a taxonomy managing unit to generate the taxonomy from one or more metadata sources, the taxonomy managing unit having a parent information handler to provide parent information for each subject item in the taxonomy.

12. The subject ranking management system as claimed in claim 1 further comprising a search query building unit to build a search query based on the ranking of the relevant subject items.

13. A method of providing a ranked search result, the method comprising:
    generating, via a search engine, a set of search results, using an index corpus, wherein the search results comprise one or more matching subject items, and wherein the matching subject items match a given set of one or more search terms;

determining, using a taxonomy, one or more parent subject items of the one or more matching subject items, wherein the taxonomy includes at least one of topics and subjects, and wherein the index corpus is related to the at least one of the topics and the subjects of the taxonomy;

statistically ranking, by a computer, relevant subject items including the matching subject items and the parent subject items, wherein statistically ranking includes determining a hierarchy score for each of the relevant subject items based on (1) hierarchy relationships between the each of the relevant subject items and other subject items, and (2) a number of references to one of the matching subject items in original data being searched, calculating ranking scores of the relevant subject items based on the hierarchy scores, and ranking the relevant subject items based on the ranking scores; and organizing the relevant subject items based on the ranking of each relevant subject item.

14. The method as claimed in claim 13, wherein the calculating step comprises:

aggregating child subject items under a matching subject item; and calculating a ranking score of the matching subject item based on hierarchy scores of the aggregated child subject items.

15. The method as claimed in claim 14, wherein the calculating comprises:

determining for each of the relevant subject items a hierarchical distance from a matching subject item; and calculating a ranking score of each of the relevant subject items based on the hierarchical distance.

16. The method as claimed in claim 15, wherein the calculating comprises:

determining the number of references to the relevant subject items in original data to be searched, and calculating a ranking score based on the number of the references.

17. The method as claimed in claim 13, wherein the parent determining comprises:

limiting augmentation of the parent or child subject items.

18. The method as claimed in claim 13 further comprising:

organizing a list of the relevant subjects based on the ranking.

19. The method as claimed in claim 18 further comprising:

providing parent information for each subject item in the taxonomy.

20. The method as claimed in claim 13, wherein the parent determining comprises receiving a search result from a full-text search engine having the taxonomy.

21. The method as claimed in claim 13 further comprising:

generating the taxonomy from one or more metadata sources; and providing parent information for each subject item in the taxonomy.

22. The method as claimed in claim 13 further comprising:

building a search query based on the ranking of the relevant subject items.

23. A computer-readable storage medium encoded with instructions for causing one or more programmable processors to:

generate a set of search results, using an index corpus, wherein the search results comprises one or more matching subject items, and wherein the matching subject items match a given set of one or more search terms;

determine, using a taxonomy, one or more parent subject items of the one or more matching subject items, wherein the taxonomy includes at least one of topics and subjects, and wherein the index corpus is related to the at least one of the topics and the subjects of the taxonomy;

statistically rank relevant subject items including the matching subject items and the parent subject items, wherein statistically ranking includes determining a hierarchy score for each of the relevant subject items based on (1) hierarchy relationships between the each of the relevant subject items and other subject items, and (2) a number of references to one of the matching subject items in original data being searched, calculating ranking scores of the relevant subject items based on the hierarchy scores, and ranking the relevant subject items based on the ranking scores; and organize the relevant subject items based on the ranking of each relevant subject item.

24. A computer program product for use in a subject ranking management system for providing ranked search results, the computer program product having computer program code embodied in a machine readable medium, the computer program product comprising:

a module to generate a set of search results, using an index corpus, wherein the search results comprises one or more matching subject items, and wherein the matching subject items match a given set of one or more search terms;

a module to determine, using a taxonomy, one or more parent subject items of one or more matching subject items, wherein the taxonomy includes at least one of topics and subjects, and wherein the index corpus is related to the at least one of the topics and the subjects of the taxonomy;

a module to statistically rank relevant subject items including the matching subject items and the parent subject items, wherein the module to statistically rank relevant subject items comprises a module to determine a hierarchy score for each of the relevant subject items based on (1) hierarchy relationships between the each of the relevant subject items and other subject items, and (2) a number of references to one of the matching subject items in original data being searched; and a module to organize the relevant subject items based on the ranking of each relevant subject item.

* * * * *